Nov. 13, 1934.  A. KÉGRESSE  1,980,276
ENDLESS TRACK VEHICLE
Filed Jan. 5, 1931
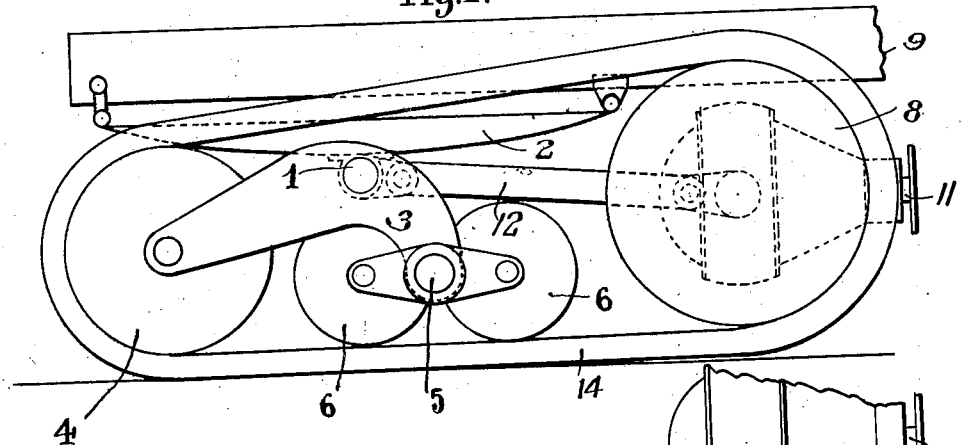
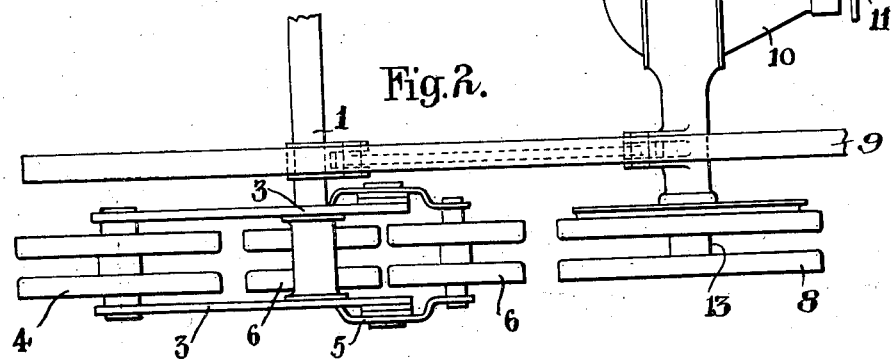
Inventor:
Adolphe Kégresse
by [signature]
Attorney.

Patented Nov. 13, 1934

1,980,276

UNITED STATES PATENT OFFICE 1,980,276

ENDLESS TRACK VEHICLE

Adolphe Kégresse, Courbevoie, France

Application January 5, 1931, Serial No. 506,827
In France December 23, 1929

1 Claim. (Cl. 305—9)

It is desirable to obtain an endless strip driving gear of reduced dimensions, and having, at the same time, as great a surface of contact with the ground as possible.

The present invention relates to a new combination of known devices, providing such endless strip gear.

Two embodiments of the invention are shown, by way of example, in the appended drawing.

Figure 1 is a diagrammatical elevational view of the device with a two roller bogie.

Figure 2 is a plan view of the first device.

Throughout these figures, 1 represents the carrying axle of the vehicle part corresponding to the endless strip driving apparatus.

This axle 1 is secured to the frame 9 in a known manner by means of two longitudinal springs.

Suitably shaped carrying equalizers 3 are adjustably mounted on each end of axle 1. These equalizers receive, at the end of their bigger arms, one of the supporting pulleys 4, 8 of the chain (Figures 1, 2), and at their other end an articulation 5 of the two roller bogie 6 (Figures 1 and 2). The driving pulley 8 is mounted on a conventional axle 13 housed within the housing associated with the usual differential mechanism casing 10. The axle 13 is connected by means of differential gearing with the shaft 11 adapted to be connected with the propeller shaft of the vehicle engine (not shown). As clearly shown in Fig. 1, the housing of axle 13 carrying the wheels or pulleys 8 is connected by links 12 with the carrying axle 1 to maintain the proper spacing between the wheels or pulleys 4 and 8.

The articulation point of the equalizers 3 on axle 1 is selected so that the load should conveniently be distributed between one of the supporting pulleys 4 of the endless strips 14 and the roller 6.

A carrying arrangement is thus obtained having a maximum surface of contact with the ground responsive to an extremely reduced total length.

The term "suspended driven pulley" appearing in the claim is intended to define a pulley suspended a determined distance above the ground.

I claim:

In an endless track vehicle, a longitudinal spring attached to the frame of the vehicle, a transverse axle carried at substantially the center of the spring, an equalizer mounted on the axle, an endless track, a suspended driven pulley at the forward end of the endless track and an idler carrier pulley cooperating with the track at the rear thereof, and a bogie truck bearing on the track between the pulleys, one end of the equalizer being carried by the axle of the idler pulley and the other end of the equalizer being carried by the bogie truck, the diameter of the idler pulley being such as to distribute the weight of the vehicle between the idler pulley and the bogie truck.

ADOLPHE KÉGRESSE.